(12) United States Patent
Rathinasamy et al.

(10) Patent No.: US 11,543,602 B1
(45) Date of Patent: Jan. 3, 2023

(54) CABLE CONNECTOR DISCONNECTION SYSTEM

(71) Applicant: Dell Products L.P., Round Rock, TX (US)

(72) Inventors: Shree Rathinasamy, Round Rock, TX (US); Maunish Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/354,964

(22) Filed: Jun. 22, 2021

(51) Int. Cl.
*G02B 6/00* (2006.01)
*G02B 6/38* (2006.01)

(52) U.S. Cl.
CPC ......... *G02B 6/3898* (2013.01); *G02B 6/3897* (2013.01)

(58) Field of Classification Search
CPC ....... G02B 6/3898; G02B 6/3897; G02B 6/00
See application file for complete search history.

(56) References Cited

U.S. PATENT DOCUMENTS

| | | | | |
|---|---|---|---|---|
| 8,025,514 B1* | 9/2011 | Wang | ................. | H01R 13/6397 385/56 |
| 2010/0029117 A1* | 2/2010 | Underwood | ......... | G02B 6/3895 439/304 |
| 2016/0259137 A1* | 9/2016 | Akabane | .............. | G02B 6/3888 |

OTHER PUBLICATIONS

"Do You Know about Push-Pull Tab Fiber Patch Cables?," Cables-Solutions.com http://www.cables-solutions.com/do-you-know-about-push-pull-tab-patch-cables.html.

* cited by examiner

*Primary Examiner* — Jennifer Doan
(74) *Attorney, Agent, or Firm* — Joseph Mencher

(57) ABSTRACT

A cable connector disconnection system includes a cable having a cable connector, and a computing device. The computing device includes a computing device connector that connects to the cable connector, a cable connector disconnection actuator that is spaced apart from the computing device connector on the computing device and that is configured to move relative to the computing device, and a cable connector engagement subsystem that is located immediately adjacent the computing device connector and that is coupled to the cable connector disconnection actuator. Movement of the cable connector disconnection actuator relative to the computing device when the cable connector is connected to the computing device connector causes the cable connector engagement subsystem to move relative to the computing device connector and into engagement with the cable connector to disconnect the cable connector from the computing device connector.

20 Claims, 13 Drawing Sheets

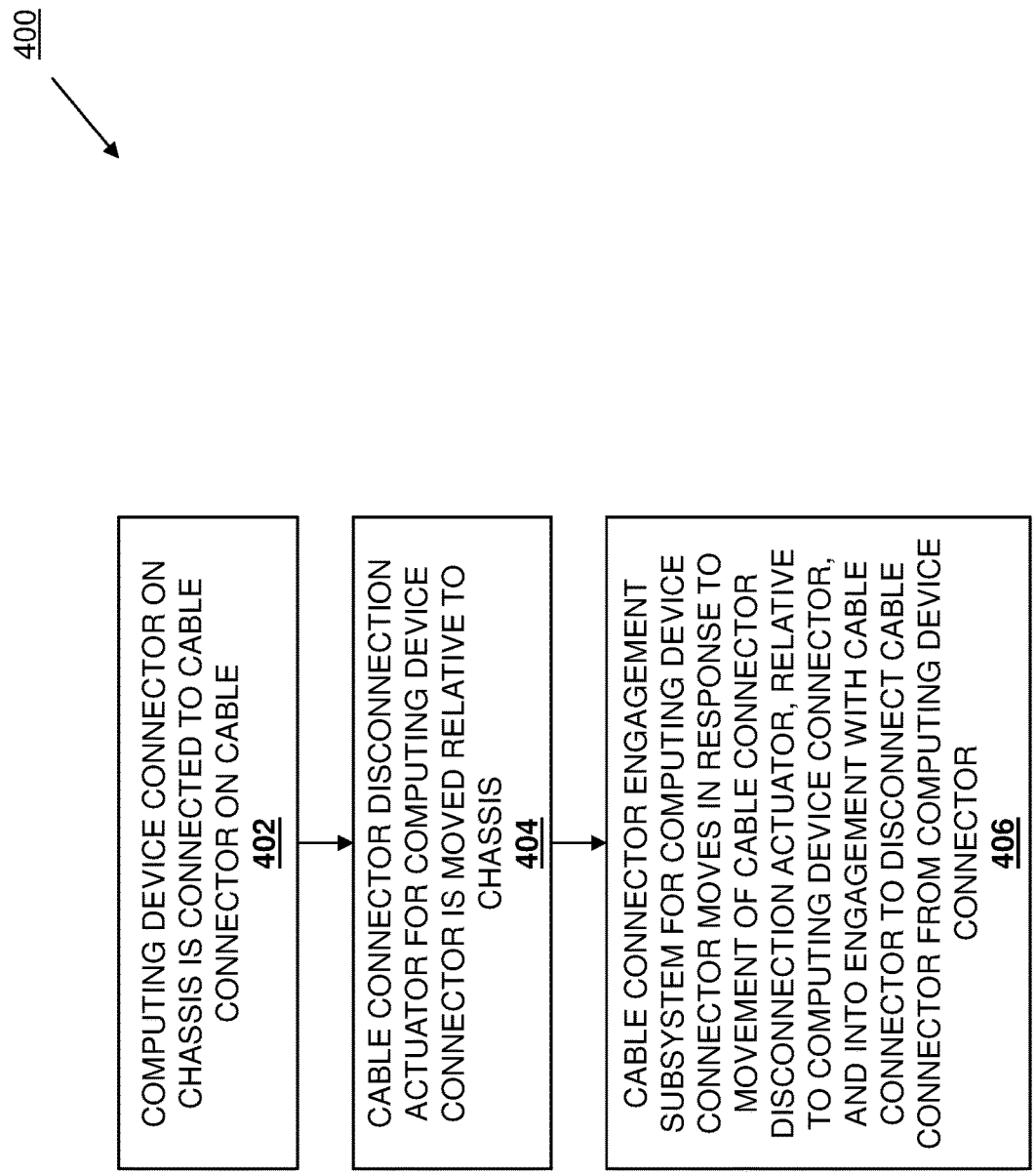

CABLE CONNECTOR DISCONNECTION SYSTEM

BACKGROUND

The present disclosure relates generally to information handling systems, and more particularly to disconnecting cable connectors from information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., co-packaged switch devices) and/or other computing devices known in the art, are often coupled together by cables such as fiber optic cables (e.g., Multi-fiber Push-On (MPO) fiber optic cables), and/or other cables known in the art. For example, conventional MPO fiber optic cables may include an MPO fiber optic connector that is configured to engage a switch port on a co-packaged switch device, and a respective securing latch may be provided adjacent the MPO fiber optic connector and may be configured to engage the co-packaged switch device to secure the MPO fiber optic connector to the switch port. Furthermore, many MPO fiber optic cables include a "pull-tab" release mechanism that is coupled to each of the securing latches and that includes an actuator that extends away from the MPO fiber optic connector, and when the MPO fiber optic connector is engaged with the switch port with the securing latch engaged with the co-packaged switch device to secure the MPO fiber optic connector to the switch port, the actuator on the "pull-tab" release mechanism may be pulled to disengage the securing latch from the co-packaged switch device in order to allow the MPO fiber optic connector to be disengaged from the switch port so that the MPO fiber optic cable may be disconnected from the co-packaged switch device. As will be appreciated by one of skill in the art in possession of the present disclosure, such "pull-tab" release mechanisms are particularly beneficial when MPO fiber optic cables/connectors are densely populated on the co-packaged switch device such that access to the securing latches on any particular MPO fiber optic cable is inhibited by other MPO fiber optic cables/connectors. However, the use of such "pull-tab" release mechanisms on conventional MPO fiber optic cables can raise some issues.

For example, MPO fiber optic cables that are used in co-packaged switch devices provided as testing equipment in data centers, vendor test laboratories, and/or other locations, may be frequently handled and require frequent connection/disconnection from the co-packaged switch devices discussed above, which can result is the actuator on the "pull-tab" release mechanism breaking off of the "pull-tab" release mechanism, particularly when such actuators are provided using very thin plastic materials (e.g., to reduce costs and allow the tab to be positioned between densely populated MPO fiber optic cables/connectors that would otherwise present difficulties with regard to accessing the securing latches as discussed above). This can result in the need to disconnect MPO fiber optic cables with broken "pull-tab" release mechanism actuators from corresponding co-packaged switch devices, which may require an amount of force that can cause damage to the MPO fiber optic cable, the co-packaged switch device, the switch port, and/or other components, and results in support calls, system down time, and/or other costs. As such, MPO fiber optic cables with broken "pull-tab" release mechanism actuators are often discarded, increasing cabling costs as well.

Accordingly, it would be desirable to provide cable connector disconnection system that addresses the issues discussed above.

SUMMARY

According to one embodiment, an Information Handling System (IHS) includes a chassis; a computing device connector that is accessible on the chassis and that is configured to connect to a cable connector; a cable connector disconnection actuator that is spaced apart from the computing device connector on the chassis and that is configured to move relative to the chassis; and a cable connector engagement subsystem that is located immediately adjacent the computing device connector and that is coupled to the cable connector disconnection actuator, wherein the movement of the cable connector disconnection actuator relative to the chassis when the cable connector is connected to the computing device connector causes the cable connector engagement subsystem to move relative to the computing device connector and into engagement with the cable connector to disconnect the cable connector from the computing device connector.

BRIEF DESCRIPTION OF THE DRAWINGS

FIG. 4 is a flow chart illustrating an embodiment of a method for disconnecting a cable connector.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
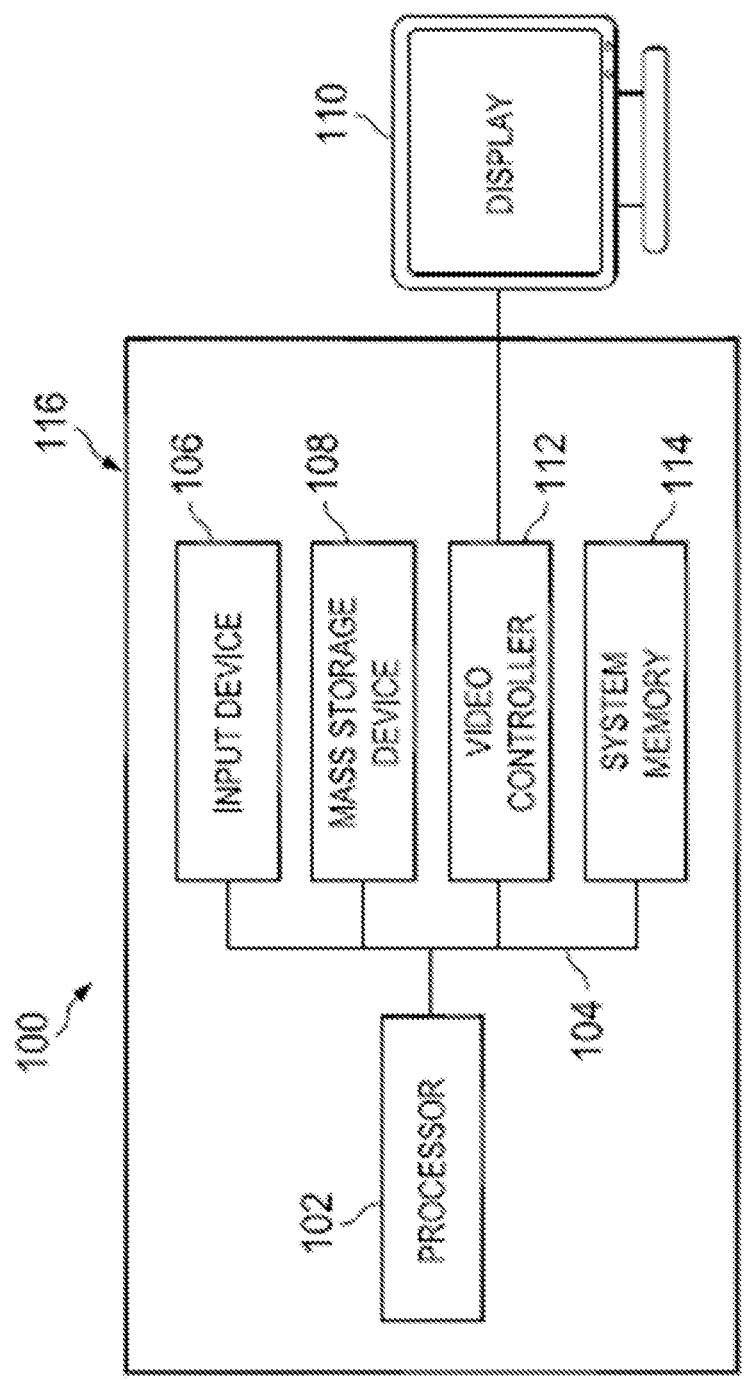
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
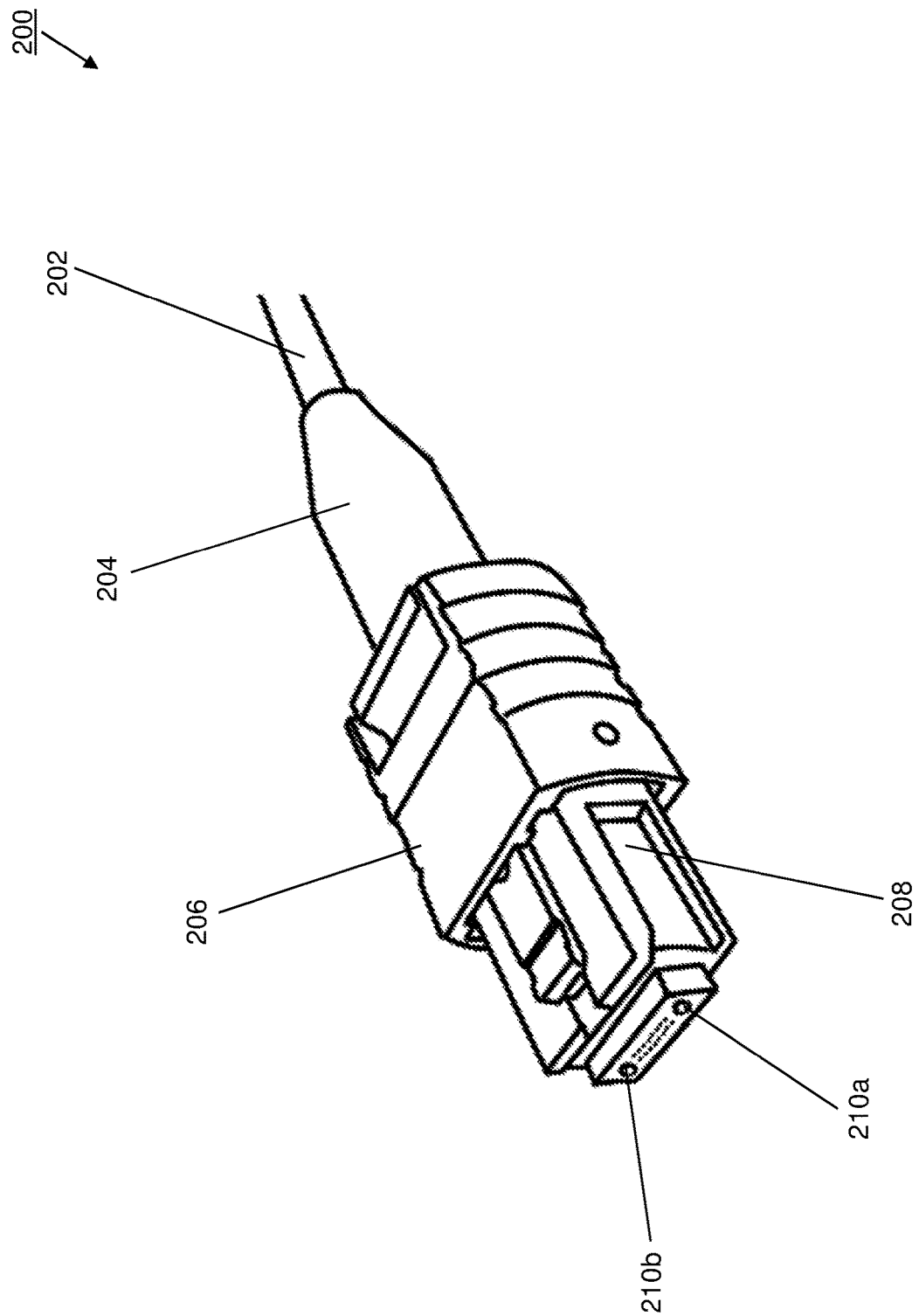
FIG. 2A is a perspective view illustrating an embodiment of a cable system.
Figure 2B:
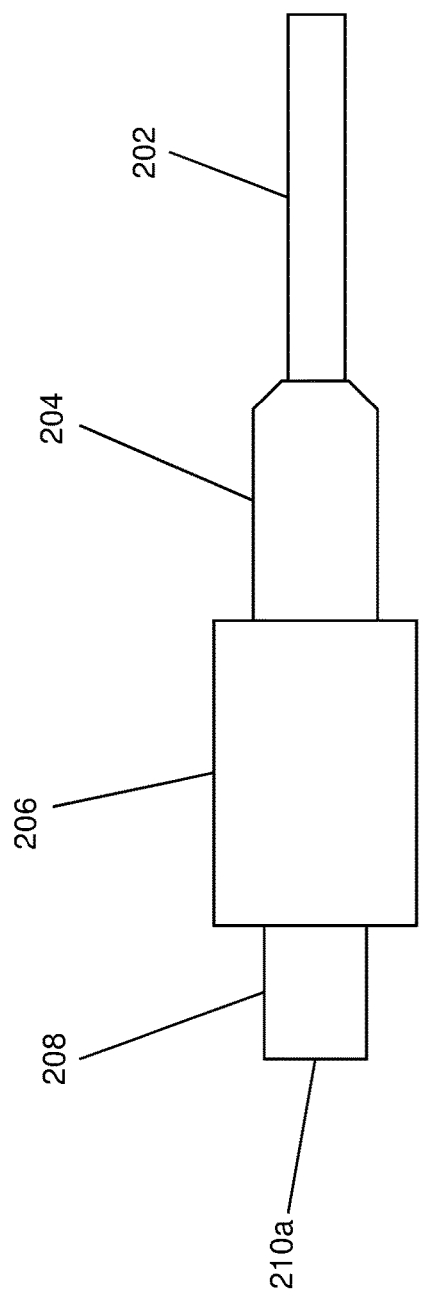
FIG. 2B is a side view illustrating an embodiment of the cable system of FIG. 2A.

Referring now to FIGS. 2A and 2B, an embodiment of a cable system 200 is illustrated. In the illustrated embodiment, the cable system 200 includes cabling 202, a cabling transition element 204 that covers the cabling 202 as it transitions to a connection to a connector sleeve 206, with a cable connector 208 extending from the connector sleeve 206 and including a pair of connectors pin couplings 210a and 210b. While not called out by element numbers, one of skill in the art in possession of the present disclosure will recognize that the cable connector 208 includes networking port securing features for securing the cable connector 208 and connector pin couplings 210a and 210b to a networking port. Furthermore, one of skill in the art in possession of the present disclosure will appreciate how the connector sleeve 206 may be configured to move relative to the cable connector 208 in order to release the cable connector 208 from a networking port, discussed in further detail below.

Figure 2C:
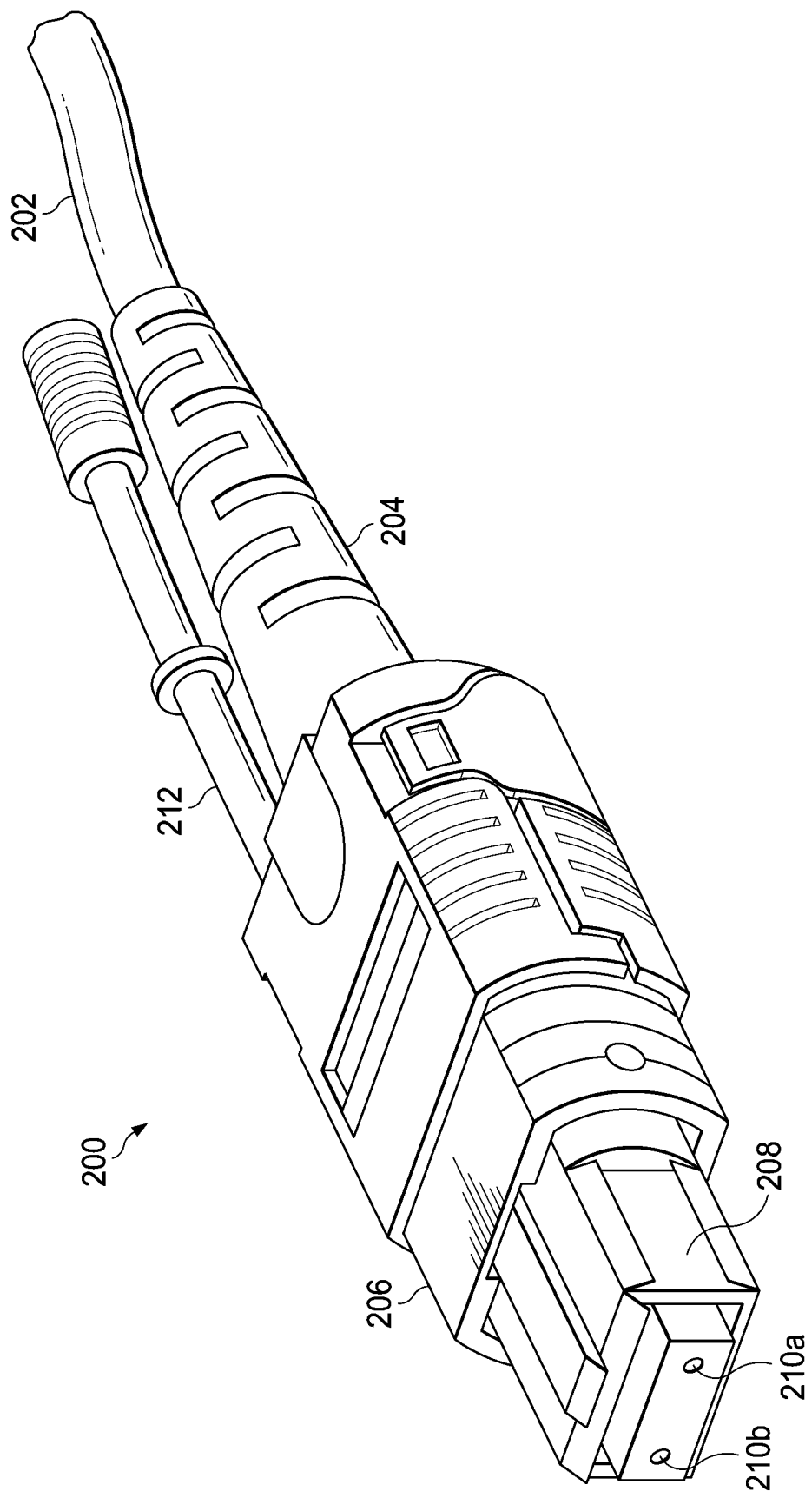
FIG. 2C is a perspective view illustrating an embodiment of the cable system of FIGS. 2A and 2B including a conventional pull-tab mechanism.

With reference to FIG. 2C, an embodiment of the cable system 200 of FIGS. 2A and 2B is illustrated with a conventional pull-tab mechanism 212. As will be appreciated by one of skill in the art in possession of the present disclosure, the conventional pull-tab mechanism 212 may be pulled by a user to move the connector sleeve 206 relative to the cable connector 208 in order to release the cable connector 208 from a networking port but, as discussed above, suffers from a number of deficiencies that are eliminated by the cable connector disconnection system of the present disclosure. However, while the cable system 200 of FIGS. 2A and 2B is illustrated and described below as being utilized with the cable connector disconnection system of the present disclosure, one of skill in the art in possession of the present disclosure will appreciate how the cable connector disconnection system of the present disclosure may be utilized with cable systems having the conventional pull-tab mechanism 212 (i.e., while negating the need to use those conventional pull-tab mechanisms) while remaining within the scope of the present disclosure as well.

Furthermore, one of skill in the art in possession of the present disclosure will appreciate how the specific example provided herein illustrates and describes the cable system 200 as a female Multi-fiber Push-On (MPO) fiber optic cable system, with the cabling 202 including fiber optic cable, and the cable connector 208 and connector pin couplings 210a and 210b provided by an MPO fiber optic connector and MPO fiber pin couplings, respectively. However, the cable connector disconnection system of the present disclosure may benefit other types of cable systems/cable connectors, and thus its application to other cable systems/cable connectors is envisioned as falling within its scope as well. As such, while a specific cable system 200 has been illustrated and described, one of skill in the art in possession of the present disclosure will recognize that the cable systems utilized according to the teachings of the present disclosure may include a variety of components and component configurations while remaining within the scope of the present disclosure as well.

Referring now to FIG. 3, an embodiment of a networking device 300 is illustrated that may be configured to connect to and disconnect from the cable system 200 discussed above with reference to FIG. 2. In an embodiment, the networking device 300 may be provided by the IHS 100 discussed above with reference to FIG. 1 and/or may include some or all of the components of the IHS 100, and in the specific examples discussed below is provided by a co-packaged switch device. However, while illustrated and discussed as a being provided by a co-packaged switch device 300, one of skill in the art in possession of the present disclosure will recognize that the functionality of the networking device 300 discussed below may be provided by other devices that are configured to operate similarly as discussed below. In the illustrated embodiment, the networking device 300 includes a chassis 301 that houses the components of the networking device 300, only some of which are illustrated below. For example, the chassis 301 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine that is configured to perform any of a variety of networking/switching functionality known in the art.

The chassis 301 may also house a communication system that is coupled to the networking engine (e.g., via a coupling between the communication system and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. For example, the communication system may include a plurality of networking ports 302, 304, 306, 308, and up to 310 that are included in a first (upper) port row on the chassis 301, and a plurality of networking ports 312, 314, 316, 318, and up to 320 that are included in a second (lower) port row on the chassis 301. While not called out by element numbers, one of skill in the art in possession of the present disclosure will recognize how each of the networking ports 302-320 includes a pair of pins that are configured to engage the connector pin couplings 210a and 210b on the cable connector 208 of the cable system 200 discussed above with reference to FIG. 2, and may also include cable connector securing features that are configured to engage the cable connector 208 on the cable system 200 to secure the cable connector 208 and connectors pin couplings 210a and 210b to that networking port. In the specific examples provided herein, the networking ports 302-320 are illustrated and described as being provided by MPO ports, but other ports are envisioned as falling within the scope of the present disclosure as well.

Figure 3A:
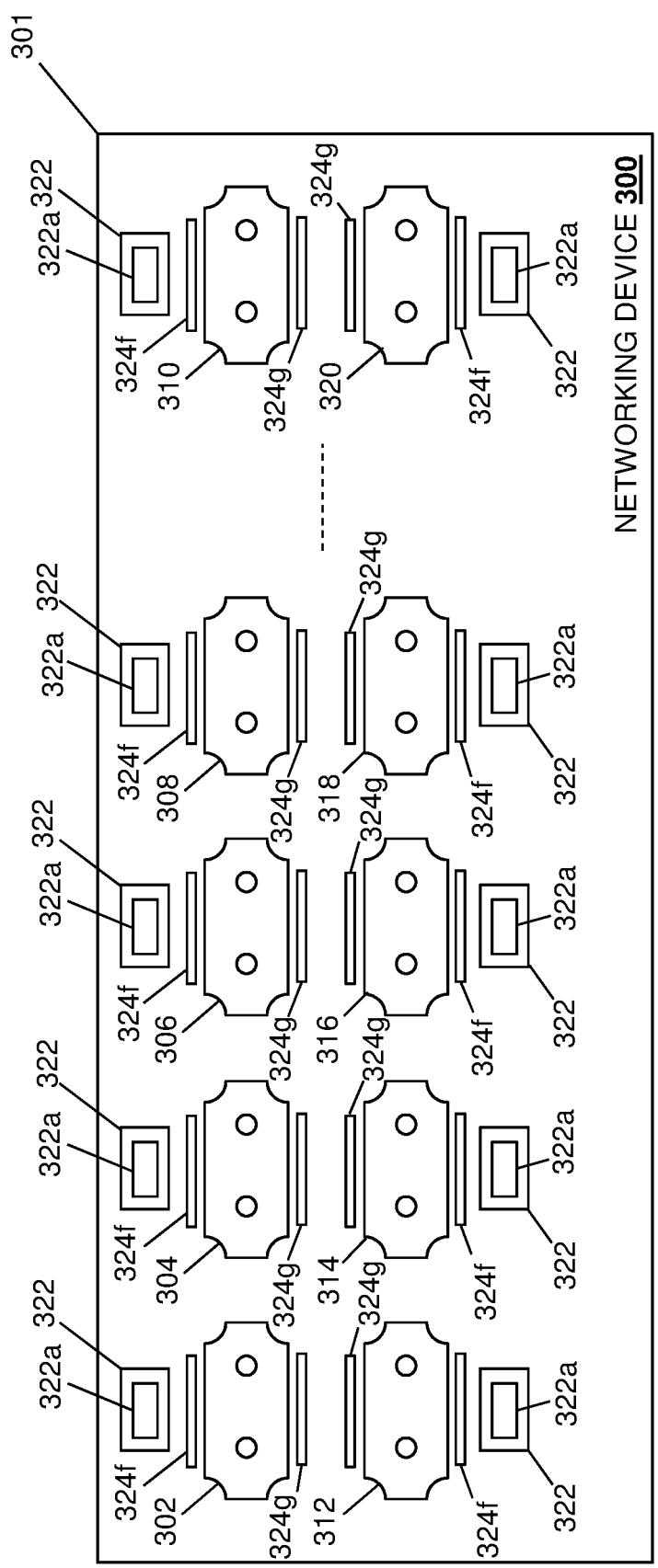
FIG. 3A is a schematic front view illustrating an embodiment of a networking device.
Figure 3B:
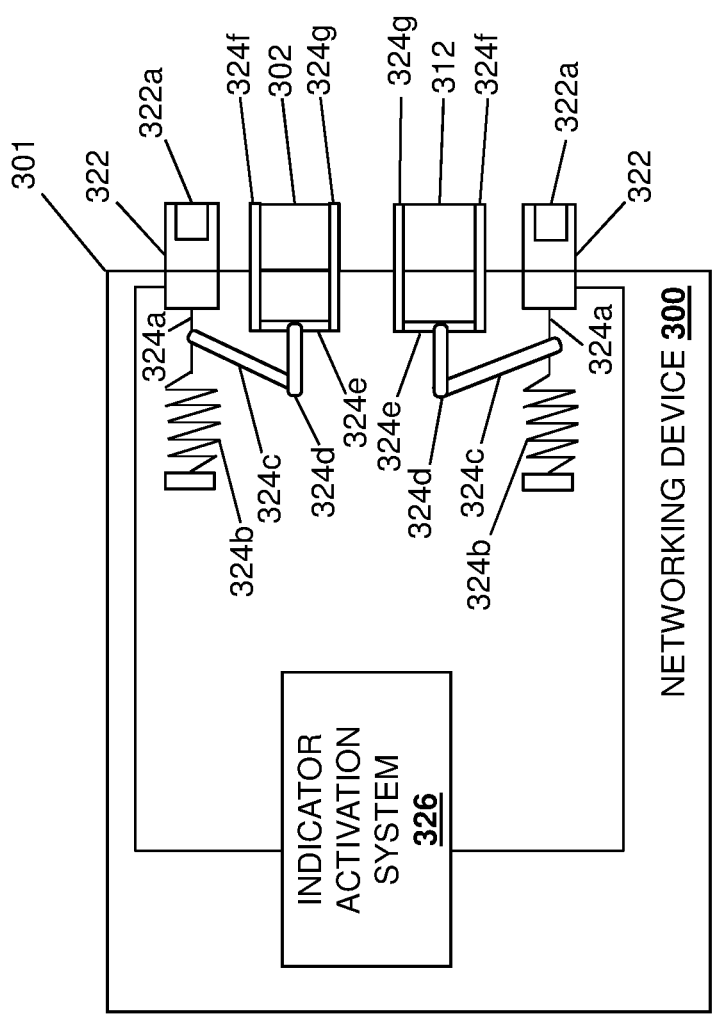
FIG. 3B is a schematic cross-sectional view illustrating an embodiment of the networking device of FIG. 3A.

In the illustrated embodiment, each of the networking ports 302-320 is provided with a cable connector disconnection subsystem, a portion which is illustrated in FIG. 3A for each networking port 302-320, with the entire cable connector disconnection subsystem illustrated for networking ports 302 and 312 in FIG. 3B. As will be appreciated by one of skill in the art in possession of the present disclosure, features of the networking ports 302 and 320, as well as their cable connector disconnection subsystems, are simplified and exaggerated in FIG. 3B in order to clarify the illustration and discussion of the operation of the cable connector disconnection subsystems. For example, each cable connector disconnection subsystem may include a cable connector disconnection actuator 322 that, in the examples below, may be provided by a button or other element that is moveable relative to the chassis 301 (e.g., into and out of a surface of the chassis 301 via which its corresponding networking port is accessible).

However, while particular "push-button" movement of the cable connector disconnection actuators 322 is described herein, one of skill in the art in possession of the present disclosure will appreciate how other actuator operations will fall within the scope of the present disclosure as well. In the embodiments provided herein, each cable connector disconnection actuator 322 includes an integrated cable connector connection indicator 322a that is illustrated and described below as being provided by a Light Emitting Device (LED), but that one of skill in the art in possession of the present disclosure will appreciate may be provided by a variety of other types of indicator devices known in the art. While not illustrated, one of skill in the art in possession of the present disclosure will appreciate how the cable connector connection indicator 322a may be powered using techniques similar to those used to power conventional LEDs that indicate port status (e.g., by drawing power from a switch power supply via a switch board). One of skill in the art in possession of the present disclosure will appreciate how the cable connector disconnection actuators 322 with integrated cable connector connection indicators 322a may provide particular benefits for high density networking ports on a networking device while also providing relatively easy access to the cable connector disconnection actuators 322. However, while a particular (push-button integrated) location of the cable connector connection indicator is described, one of skill in the art in possession of the present disclosure will appreciate how the cable connector connection indicators 322a may be provided in different locations while remaining within the scope of the present disclosure as well.

With particular reference to FIG. 3B, each cable connector disconnection subsystem may also include a cable connector engagement subsystem that, in the illustrated examples, includes a biasing beam 324a that is connected to a resilient member 324b (e.g., a spring or other resilient element known in the art) that is configured to bias the biasing beam 324 (and thus the cable connector disconnection actuator 322) out of the chassis 301 (out of the surface of the chassis 301 via which its corresponding networking port is accessible). Each cable connector engagement subsystem may also include a rotatable element 324c that is connected to the biasing beam 324a that is configured to rotate about a pivot point along its length to translate movement of the biasing beam 324a (e.g., caused by the movement of the cable connector disconnection actuator 322 via a force or the resilient member 324b as discussed below) to a translation element that includes translation beams 324d and 324e that are connected in a T-shaped structure in the illustrated example. A pair of engagement elements 324f and 324g extend substantially perpendicularly from opposite ends of the translation beam 324e and adjacent opposite sides of their networking port, and are configured to move relative to the chassis 301 and their networking port in response to movement of the cable connector disconnection actuator 322 that is translated via the biasing beam 324a, the rotatable element 324c, and the translation beams 324d and 324e. However, while specific cable connector disconnection subsystems having particular structures are illustrated and described, one of skill in the art in possession of the present disclosure will appreciate how the functionality of the cable connector disconnection subsystems discussed below may be provided in a variety of manners that will fall within the scope of the present disclosure as well.

In the illustrated embodiment, an indicator actuation system 326 is provided in the chassis 301 and coupled to the cable connector connection indicators 322a in each of the cable connector disconnection actuators 322, and may include a proximity sensor located adjacent each networking port (e.g., in the cable connector disconnection actuator 322 for that networking port, or in other locations that would be apparent to one of skill in the art in possession of the present disclosure), and a cable connector connection indicator activation subsystem that is coupled to that proximity sensor and the cable connector connection indicator 322a for that networking port, which as discussed below allows for the activation of that cable connector connection indicator 322a when that proximity sensor detects a cable connector in that networking port. However, while a specific networking device 300 has been illustrated and described, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Referring now to FIG. 4, an embodiment of a method 400 for disconnecting a cable connector is illustrated. As discussed below, the systems and methods of the present disclosure provide a cable connector disconnection subsystem for a networking port on a networking device that, when a cable connector on a cable is connected to that networking port, includes a cable connector disconnection actuator that may be actuated to move the cable connector disconnection actuator relative to the networking device, with that movement translated to the cable connector disconnection subsystem such that the cable connector disconnection subsystem extends adjacent the networking port and into engagement with the cable connector to disconnect the cable connector from the networking port. For example, the cable connector disconnection system of the present disclosure may include a cable having a cable connector, and a computing device. The computing device includes a computing device connector that connects to the cable connector, a cable connector disconnection actuator that is spaced apart from the computing device connector on the computing device and that is configured to move relative to the computing device, and a cable connector engagement subsystem that is located immediately adjacent the computing device connector and that is coupled to the cable connector disconnection actuator. Movement of the cable connector disconnection actuator relative to the computing device when the cable connector is connected to the computing device connector causes the cable connector engagement subsystem to move relative to the computing device connector and into engagement with the cable connector to disconnect the cable connector from the computing device connector. As such, issues with conventional "pull-tab" cable connection disconnection/release mechanisms discussed above are eliminated.

Figure 5A:
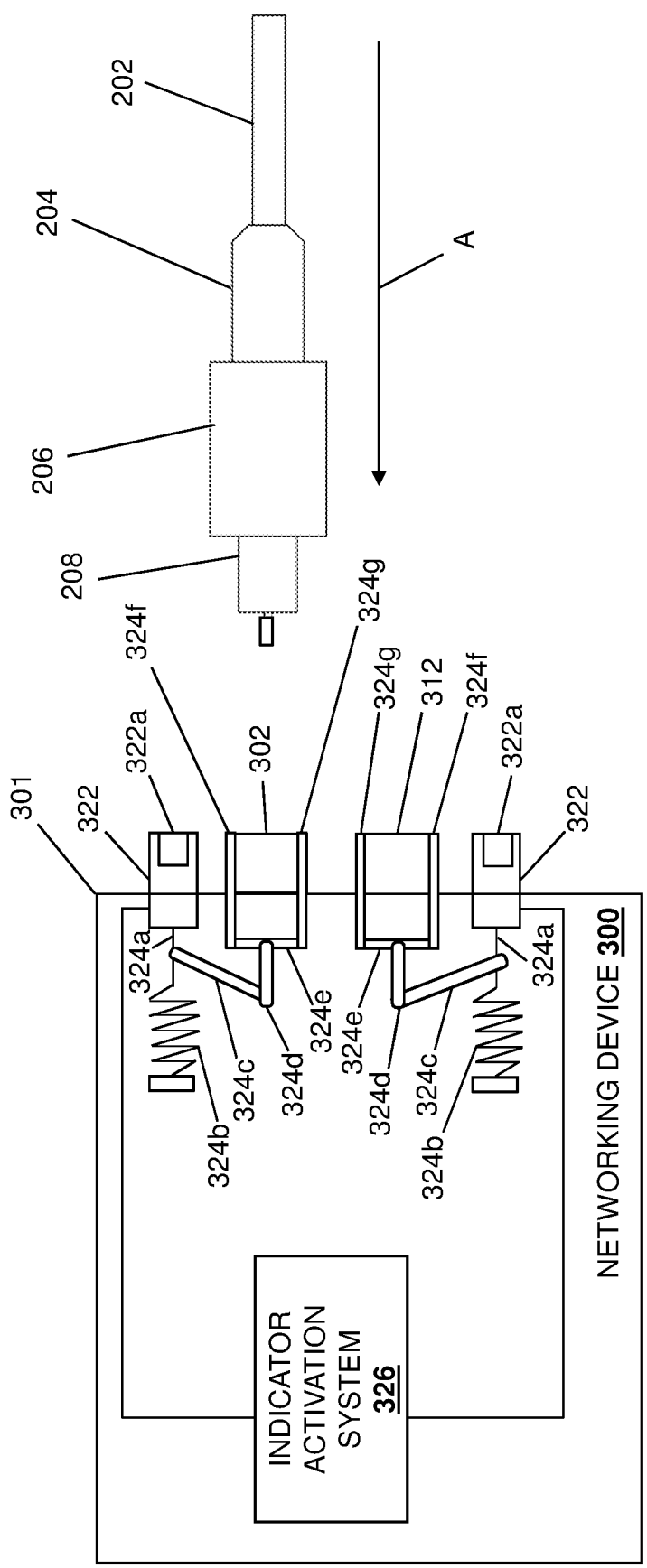
FIG. 5A is a schematic view illustrating an embodiment of the cable system of FIGS. 2A and 2B being connected to the networking device of FIGS. 3A and 3B during the method of FIG. 4.
Figure 5B:
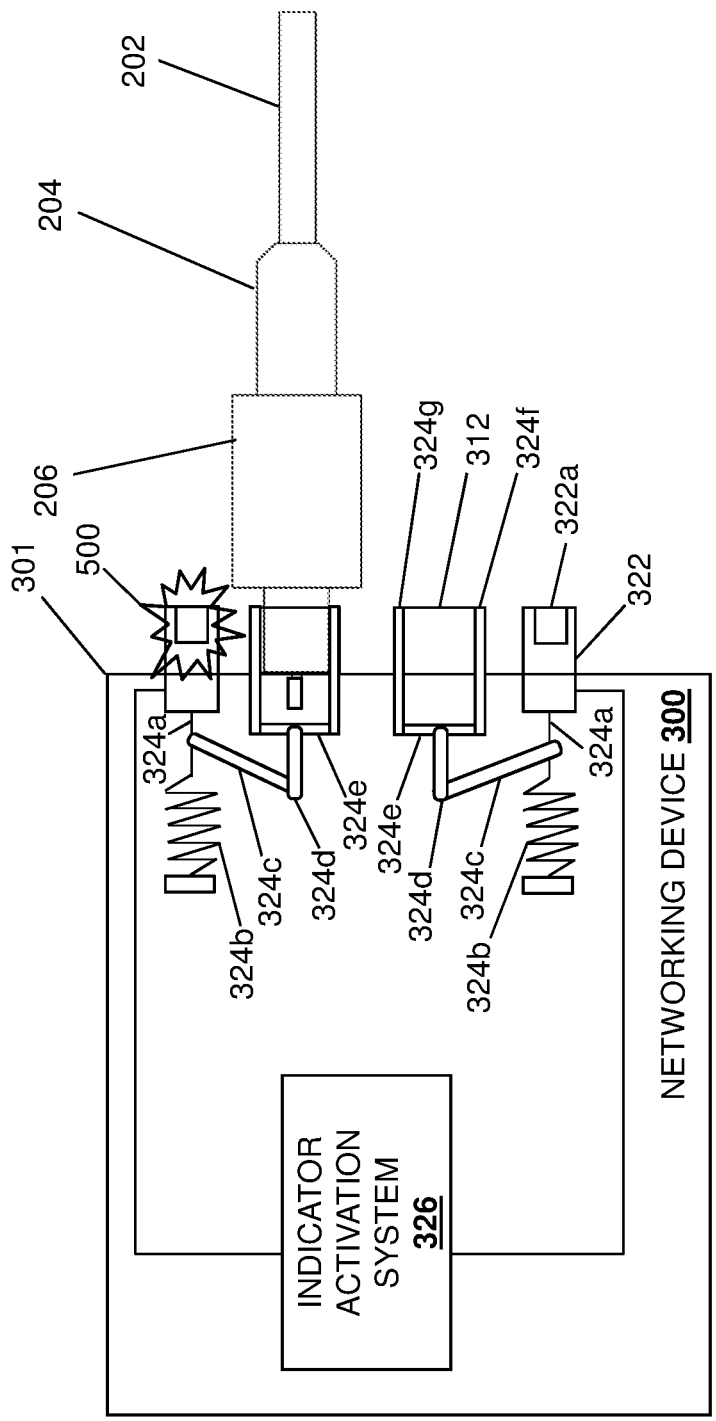
FIG. 5B is a schematic view illustrating an embodiment of the cable system of FIGS. 2A and 2B connected to the networking device of FIGS. 3A and 3B during the method of FIG. 4.

The method 400 begins at block 402 where a computing device connector on a chassis is connected to a cable connector on a cable. While the cable connector disconnection system of the present disclosure is illustrated and described below as being utilized with the networking port 302, one of skill in the art in possession of the present disclosure will appreciate how similar operations may be performed for any of the networking ports 304-320 while remaining within the scope of the present disclosure as well. With reference to FIGS. 5A and 5B, in an embodiment of block 402, a user of the networking device 300/cable system 200 may position the cable system 200 adjacent the cable connector 302 on the networking device 300 such that the cable connector 208 is aligned with the networking port 302 (e.g., with the connector pin couplings 210a and 210b on the cable connector 208 aligned with the pins on the networking port 302). The user may then move the cable system 200 in a direction A such that the cable connector 208 enters the networking port 302 and the connector pin couplings 210a and 210b on the cable connector 208 engage the pins on the networking port 302. As will be appreciated by one of skill in the art in possession of the present disclosure, the networking port 302 and/or the cable connector 208 may include alignment features that operate to align the connector pin couplings 210a and 210b on the cable connector 208 with the pins on the networking port 302 to ensure their engagement as the cable system 200 is moved in the direction A, as well as securing features that operate to secure the cable connector 208 to the networking port 302 (and the connector pin couplings 210a and 210b on the cable connector 208 in the pins on the networking port 302) as well.

As illustrated in FIG. 5B, in some embodiments the cable connector connection indicator 322a on the cable connector disconnection actuator 322 may illuminate (as indicated by element 500 in FIG. 5B) in response to the connection of the cable connector 208/connector pin couplings 210a/210b to the networking port 302. For example, the proximity sensor provided by the indicator activation system 326 for the networking port 302 may detect the coupling/connection of the cable connector 208/connector pin couplings 210a/210b to the networking port 302 (e.g., via the proximity of the cable connector 208/connector pin couplings 210a/210b to that proximity sensor as that coupling/connection occurs) and, in response, may provide a connection signal to the cable connector connection indicator 322a that causes it to illuminate and indicate to a user that the cable system 200 is properly connected to the networking port 302. However, as discussed above, while a particular technique for detecting a connection (e.g., proximity) and providing a connection indication (e.g., illumination of an LED) are described herein, one of skill in the art in possession of the present disclosure will appreciate how the connection of the cable system 200 to the networking port 302 may be indicated in a variety of manners that will fall within the scope of the present disclosure as well. As will be appreciated by one of skill in the art in possession of the present disclosure, following the connection of the cable system 200 to the networking port 302, the networking device 300 may utilize the networking port 302/cable system 200 to transmit data to device(s) coupled to networking port 302 via the cable system 200.

Figure 5C:
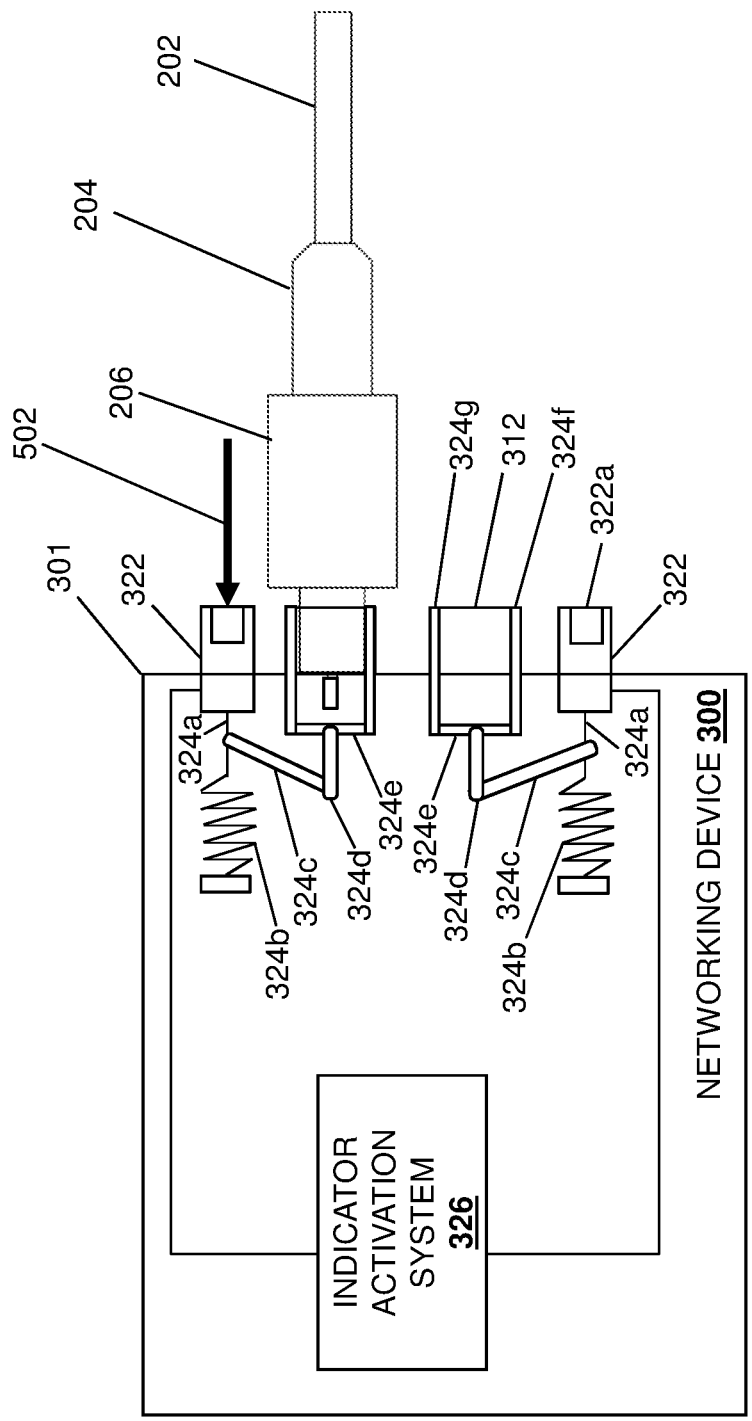
FIG. 5C is a schematic view illustrating an embodiment of the cable system of FIGS. 2A and 2B being disconnected from the networking device of FIGS. 3A and 3B during the method of FIG. 4.
Figure 5D:
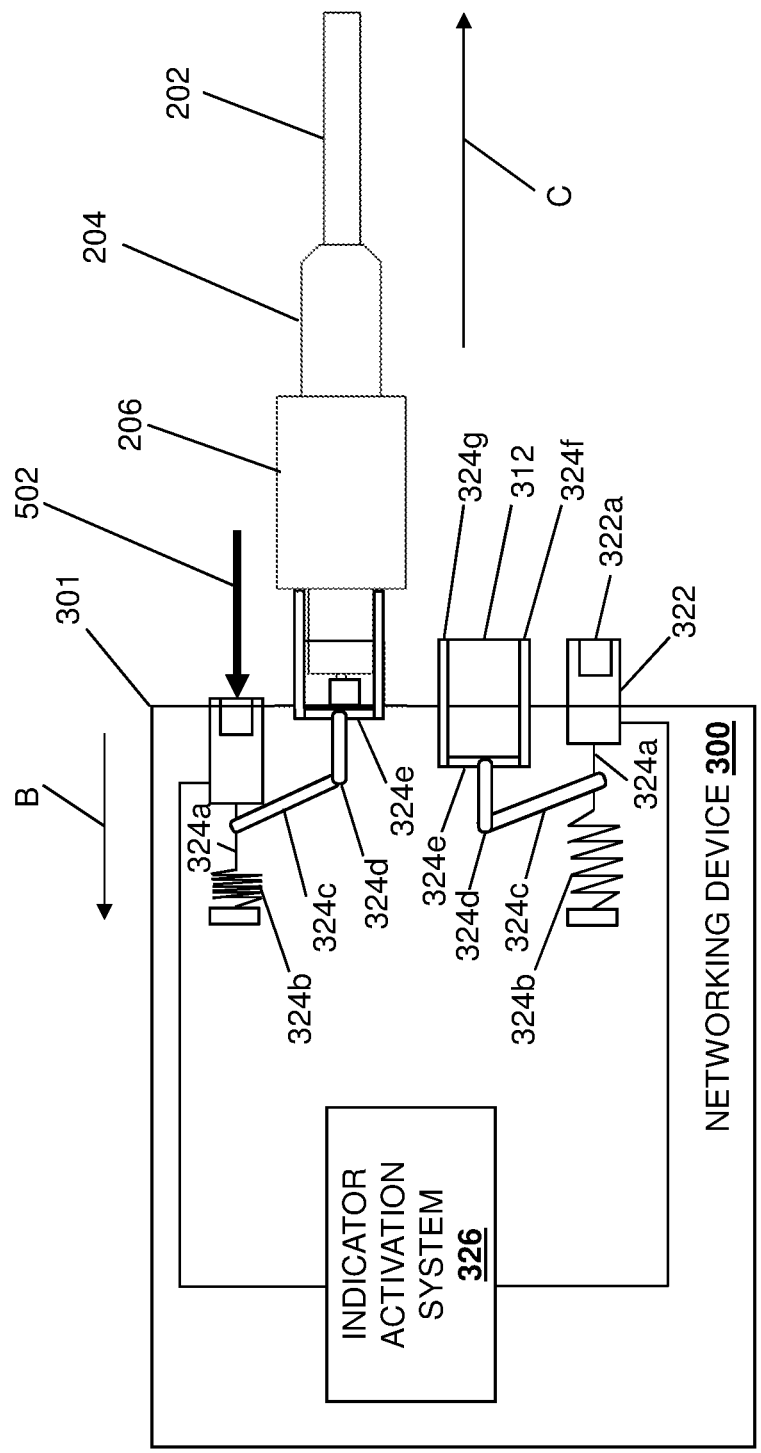
FIG. 5D is a schematic view illustrating an embodiment of the cable system of FIGS. 2A and 2B being disconnected from the networking device of FIGS. 3A and 3B during the method of FIG. 4.
Figure 5E:
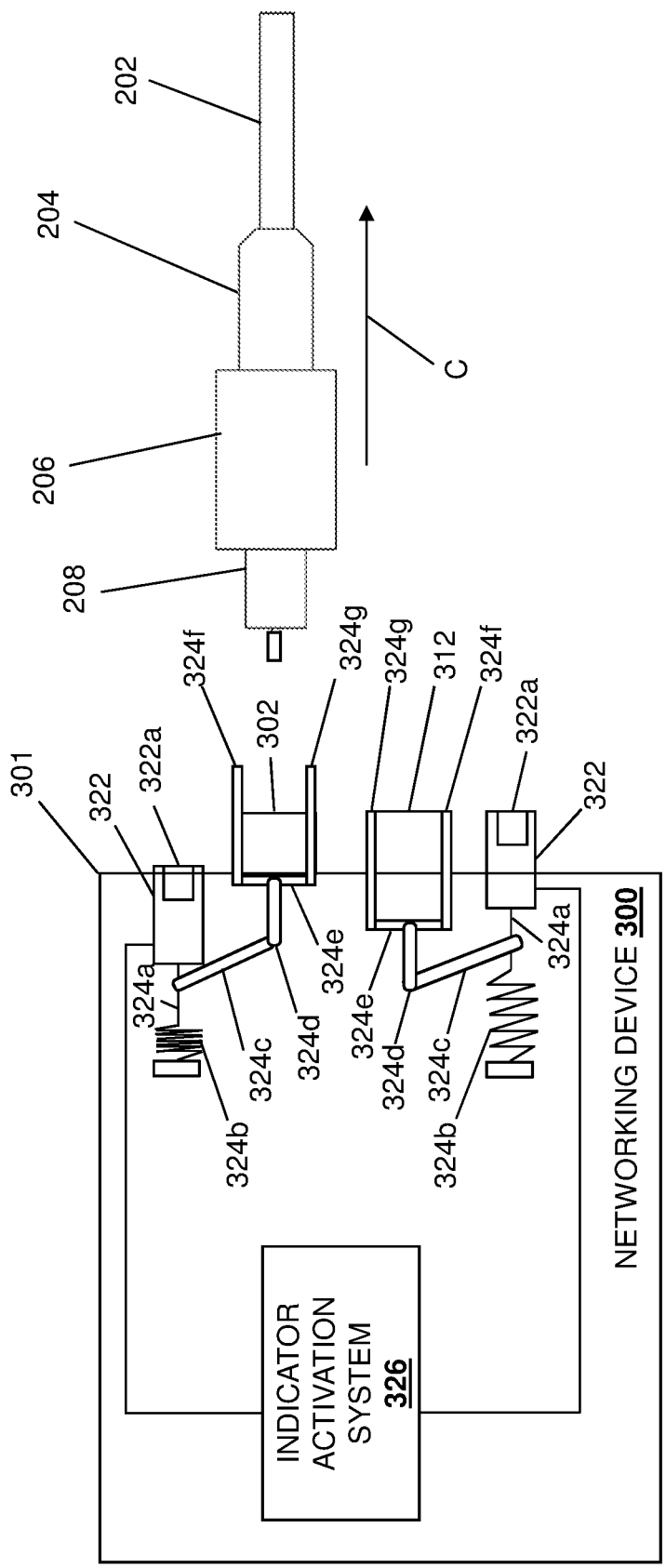
FIG. 5E is a schematic view illustrating an embodiment of the cable system of FIGS. 2A and 2B disconnected from the networking device of FIGS. 3A and 3B during the method of FIG. 4.
Figure 5F:
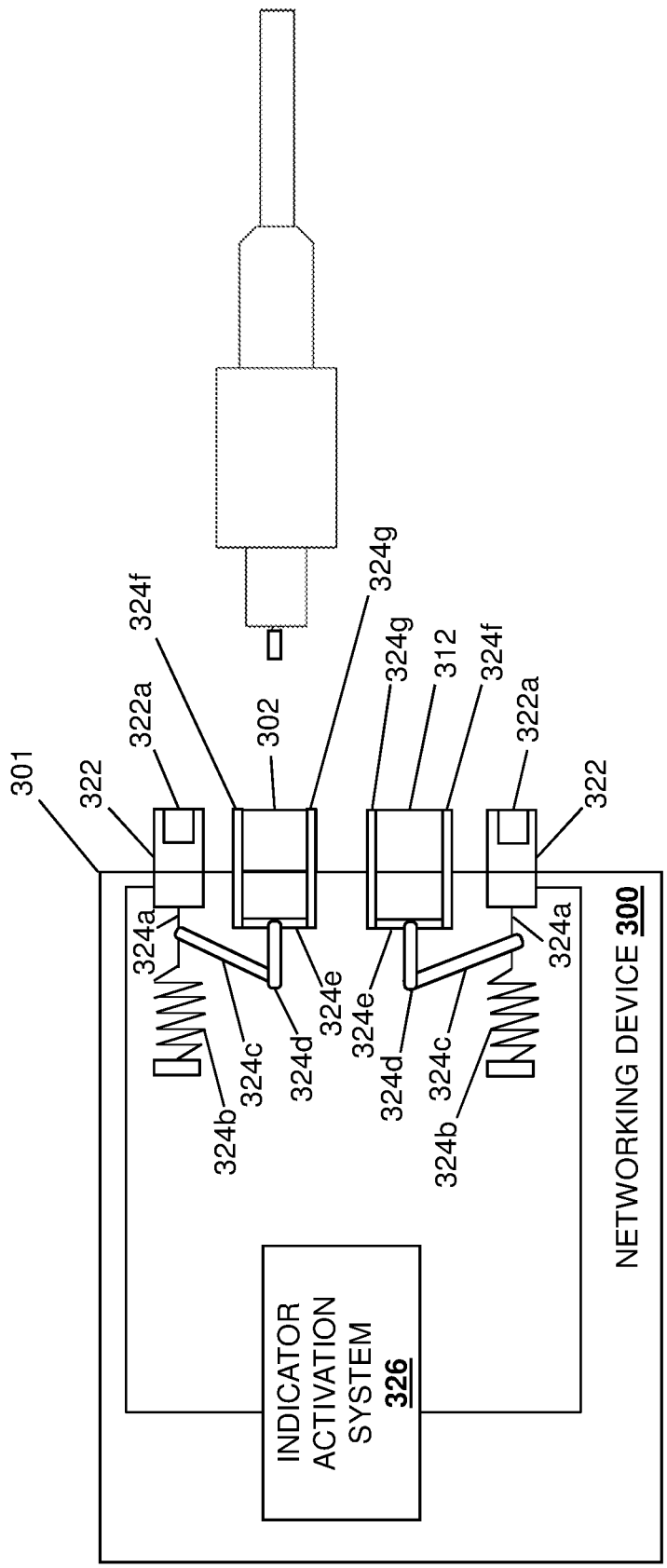
FIG. 5F is a schematic view illustrating an embodiment of the cable system of FIGS. 2A and 2B disconnected from the networking device of FIGS. 3A and 3B during the method of FIG. 4.

The method 400 then proceeds to block 404 where a cable connector disconnection actuator for the computing device connector is moved relative to the chassis. With reference to FIGS. 5C and 5D, in an embodiment of block 404, the user of the networking device 300/cable system 200 may wish to disconnect the cable system 200 from the networking port 302 on the networking device 300. As illustrated in FIG. 5C, the user of the networking device 300/cable system 200 may provide a force 502 on the cable connector disconnection actuator 322 by pressing a "push-button" cable connector disconnection actuator in this example which, as illustrated in FIG. 5D, may cause the cable connector disconnection actuator 322 to move in a direction B relative to the chassis 301. However, as discussed above, other embodiments of the present disclosure may utilize other types of cable connector disconnection actuators that may be actuated in other manners while remaining within the scope of the present disclosure as well.

The method 400 then proceeds to block 406 where a cable connector disconnection subsystem for the computing device connector moves in response to movement of the cable connector disconnection actuator, relative to the computing device connector, and into engagement with the cable connector to disconnect the cable connector from the computing device connector. With reference again to FIG. 5D, in an embodiment of block 406, the force 502 on the cable connector disconnection actuator 322 that causes the cable connector disconnection actuator 322 to move in the direction B relative to the chassis 301 also moves the biasing beam 324a by overcoming the force provided by the resilient member 324b (e.g., a spring force or other resilient force known in the art) to move the cable connector disconnection actuator 322 (and the biasing beam 324) into the chassis 301 (into the surface of the chassis 301 via which the networking port 302 is accessible). As can be seen in FIG. 5D, movement of the biasing beam 324a rotates the rotatable element 324c about the pivot point along its length to translate the movement of the biasing beam 324a (e.g., caused by the movement of the cable connector disconnection actuator 322 via the force 502) to the translation element that includes translation beams 324d and 324e connected in the T-shaped structure in the illustrated examples.

Furthermore, movement of the translation element moves the pair of engagement elements 324f and 324g relative to the networking port 302 such that they extend from the networking port 302 and into engagement with the connector sleeve 206 on the cable system 200. As illustrated in FIG. 5D, engagement of the engagement elements 324f and 324g with the connector sleeve 206 and continued movement of the engagement elements 324f and 324g will provide sufficient force on connector sleeve 206 to cause the connector sleeve 206 to move relative to the cable connector 208 to release the cable connector 208 from the networking port 302, and may further cause the cable system 200 to move in a direction C and will operate to disconnect the cable connector 208/connector pin couplings 210a/210b from the networking port 302. As will be appreciated by one of skill in the art in possession of the present disclosure, the cable connector disconnection subsystem may be configured in a manner that allows the force 502 (which may not exceed "push-button" force thresholds known in the art) to be translated into a force that is sufficient to move the connector sleeve 206 relative to the cable connector 208 and, in some examples, disengage the securing features on the cable connector 208 and the networking port 302 in order to allow their disconnection and movement in the direction C illustrated in FIG. 5D. As will also be appreciated by one of skill in the art in possession of the present disclosure, the illumination of the cable connector connection indicator 322a (illustrated and described above with reference to FIG. 5B) may continue as long as the cable connector 208 and the networking port 302 are connected, and may cease once they are disconnected and/or moved in the direction C illustrated in FIG. 5D. Following the disconnection of the cable connector 208 and the networking port 302, the user of the networking device 300/cable system 200 may continue to move the cable system 200 in the direction C to remove the cable system 200 from the networking device 300, and may connect that cable system 200 to another networking port.

Thus, systems and methods have been described that provide a MPO cable connector disconnection subsystem for a switch port on a switch device that, when an MPO cable connector on an MPO cable is connected to that switch port, includes an MPO cable connector disconnection actuator that may be actuated to move the MPO cable connector disconnection actuator relative to the switch device, with that movement translated to an MPO cable connector disconnection subsystem such that the MPO cable connector disconnection subsystem extends adjacent the switch port and into engagement with the MPO cable connector to disconnect the MPO cable connector from the switch port. For example, the MPO cable connector disconnection system of the present disclosure may include an MPO cable having an MPO cable connector, and a switch device. The switch device includes a switch port that connects to the MPO cable connector, an MPO cable connector disconnection actuator that is spaced apart from the switch port on the switch device and that is configured to move relative to the switch device, and an MPO cable connector engagement subsystem that is located immediately adjacent the switch port and that is coupled to the MPO cable connector disconnection actuator. Movement of the MPO cable connector disconnection actuator relative to the switch device when the MPO cable connector is connected to the switch port causes the MPO cable connector engagement subsystem to move relative to the switch port and into engagement with the MPO cable connector to disconnect the MPO cable connector from the switch port. As such, issues with conventional "pull-tab" cable connection disconnection/release mechanisms are eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable connector disconnection system, comprising:
a cable including a cable connector; and
a computing device including:
    a computing device connector that is configured to connect to the cable connector;
    a cable connector disconnection actuator that is spaced apart from the computing device connector on the computing device and that is configured to move relative to the computing device; and
    a cable connector engagement subsystem that is located immediately adjacent the computing device connector and that is coupled to the cable connector disconnection actuator, wherein the movement of the cable connector disconnection actuator relative to the computing device when the cable connector is connected to the computing device connector causes the cable connector engagement subsystem to move relative to the computing device connector and into engagement with the cable connector to disconnect the cable connector from the computing device connector.

2. The system of claim 1, wherein the cable connector includes a cable connector sleeve, and wherein the movement of the cable connector disconnection actuator relative to the computing device when the cable connector is connected to the computing device connector causes the cable connector engagement subsystem to move relative to the computing device connector and into engagement with the cable connector sleeve to disconnect the cable connector from the computing device connector.

3. The system of claim 1, wherein the cable connector disconnection actuator extends from the computing device and is configured to move into the computing device in response to a force on the cable connector disconnection actuator.

4. The system of claim 1, wherein the computing device further includes:
a cable connector connection indicator; and
a cable connector sensor that is coupled to the cable connector connection indicator and that is configured to:
detect that the cable connector has been connected to the computing device connector; and
cause, in response to detecting that the cable connector has been connected to the computing device connector, the cable connector connection indicator to indicate the connection of the cable connector to the computing device connector.

5. The system of claim 4, wherein the cable connector connection indicator is included on the cable connector disconnection actuator.

6. The system of claim 1, wherein the cable is a Multi-fiber Push On (MPO) fiber optic cable and the cable connector is an MPO cable connector.

7. An Information Handling System (IHS), comprising:
a chassis;
a computing device connector that is accessible on the chassis and that is configured to connect to a cable connector;
a cable connector disconnection actuator that is spaced apart from the computing device connector on the chassis and that is configured to move relative to the chassis; and
a cable connector engagement subsystem that is located immediately adjacent the computing device connector and that is coupled to the cable connector disconnection actuator, wherein the movement of the cable connector disconnection actuator relative to the chassis when the cable connector is connected to the computing device connector causes the cable connector engagement subsystem to move relative to the computing device connector and into engagement with the cable connector to disconnect the cable connector from the computing device connector.

8. The IHS of claim 7, wherein the movement of the cable connector disconnection actuator relative to the chassis when the cable connector is connected to the computing device connector causes the cable connector engagement subsystem to move relative to the computing device connector and into engagement with a cable connector sleeve on the cable connector to disconnect the cable connector from the computing device connector.

9. The IHS of claim 7, wherein the cable connector disconnection actuator extends from the chassis and is configured to move into the chassis in response to a force on the cable connector disconnection actuator.

10. The IHS of claim 9, further comprising:
a resilient member that is coupled to the cable connector disconnection actuator and that is configured to bias the cable connector disconnection actuator to extend from the chassis in the absence of the force on the cable connector disconnection actuator.

11. The IHS of claim 7, further comprising:
a cable connector connection indicator; and
a cable connector sensor that is coupled to the cable connector connection indicator and that is configured to:
detect that the cable connector has been connected to the computing device connector; and
cause, in response to detecting that the cable connector has been connected to the computing device connector, the cable connector connection indicator to indicate the connection of the cable connector to the computing device connector.

12. The IHS of claim 11, wherein the cable connector connection indicator is included on the cable connector disconnection actuator.

13. The IHS of claim 7, wherein the computing device connector is configured to connect to a Multi-fiber Push On (MPO) fiber optic cable connector on an MPO cable.

14. A method for disconnecting a cable connector, comprising:
connecting, by a computing device connector on a chassis, to a cable connector on a cable;
moving, by a cable connector disconnection actuator that is included on the chassis and spaced apart from the computing device connector, relative to the chassis; and
moving, by a cable connector engagement subsystem that is located immediately adjacent the computing device connector on the chassis and in response to the movement of the cable connector disconnection actuator relative to the chassis, relative to the computing device connector and into engagement with the cable connector to disconnect the cable connector from the computing device connector.

15. The method of claim 14, wherein the movement of the cable connector disconnection actuator relative to the chassis causes the cable connector engagement subsystem to move relative to the computing device connector and into engagement with a cable connector sleeve on the cable connector to disconnect the cable connector from the computing device connector.

16. The method of claim 14, wherein the cable connector disconnection actuator extends from the chassis and is configured to move into the chassis in response to a force on the cable connector disconnection actuator.

17. The method of claim 16, further comprising:
biasing, by a resilient member that is coupled to the cable connector disconnection actuator, the cable connector disconnection actuator to extend from the chassis in the absence of the force on the cable connector disconnection actuator.

18. The method of claim 14, further comprising:
detecting, by a cable connector connection sensor that is included in the chassis, that the cable connector has been connected to the computing device connector; and
causing, by the cable connector connection sensor in response to detecting that the cable connector has been connected to the computing device connector, a cable connector connection indicator to indicate the connection of the cable connector to the computing device connector.

19. The method of claim 18, wherein the cable connector connection indicator is included on the cable connector disconnection actuator.

20. The method of claim 14, wherein the cable is a Multi-fiber Push On (MPO) fiber optic cable and the cable connector is an MPO cable connector.

* * * * *